J. MILLER.
BATTERY FASTENER.
APPLICATION FILED FEB. 21, 1921.
1,438,130.
Patented Dec. 5, 1922.
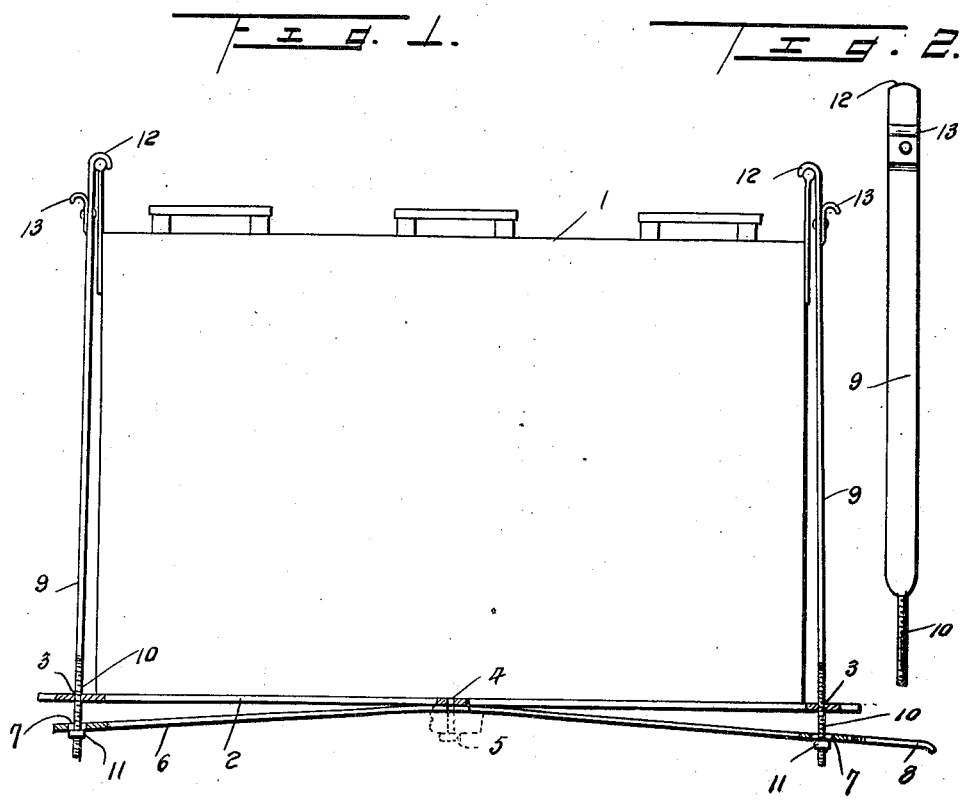
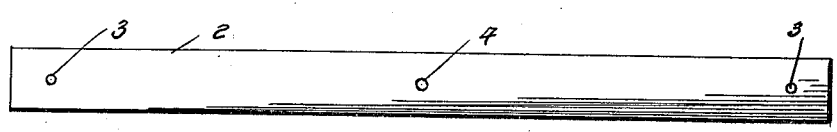
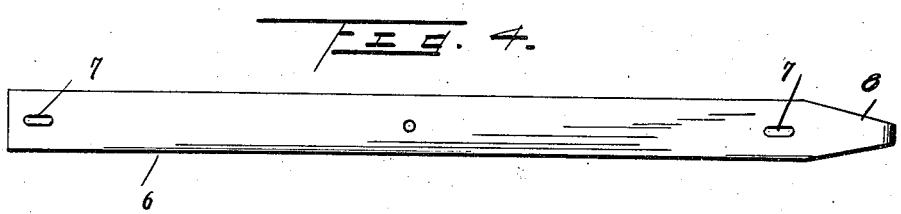
Inventor
J. Miller Patented Dec. 5, 1922.

1,438,130

UNITED STATES PATENT OFFICE.

JOHN MILLER, OF SAVANNA, ILLINOIS.

BATTERY FASTENER.

Application filed February 21, 1921. Serial No. 446,583.

*To all whom it may concern:*

Be it known that I, JOHN MILLER, a citizen of the United States, residing at Savanna, in the county of Carroll and State of Illinois, have invented certain new and useful Improvements in Battery Fasteners; and I do hereby declare the following to be a full, clear, and exact description of the invention, such as will enable others skilled in the art to which it appertains to make and use the same.

The storage batteries of motor vehicles are made secure to prevent movement or displacement by the vibration of the machine when in motion. The fastening means usually resorted to rust and corrode from the fumes given off by the battery and considerable trouble is experienced in loosening the fastenings when it is required to remove the battery.

The present invention provides means for securing the batteries of motor vehicles without necessitating recourse to tools of any nature and which admits of the battery being easily and quickly released or fastened as required, the structure being such as not to be impaired in action by the fumes or vapors given off by the battery.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a view in elevation of battery fastening means illustrative of the invention, Figure 2 is an elevation of one of the clamp members, Figure 3 is a plan view of the support or base member, and Figure 4 is a plan view of the spring.

Corresponding and like parts are referred to in the following description and designated in the several views of the drawings by like reference characters.

The numeral 1 designates a storage battery such as usually provided for motor vehicles and which is required to be fastened to prevent displacement by the vibration and various movements of the machine when the latter is in motion. This battery is illustrated to demonstrate the application of the invention.

The fastening means embodies a support or base 2 which usually consists of a strip or bar having intermediate and end openings. The support 2 may be of any length and width, depending upon the size of the fastener. The end openings are indicated at 3 and an intermediate opening at 4. The support 2 is adapted to be secured to the running board or other convenient part of the chassis of the machine in any substantial way by fastening means 5 passing through the intermediate openings 4 in a manner well understood. A latch spring 6 is secured intermediate its ends to the support 2 and its end portions curved downwardly or away from the plane of the support 2 and are provided with elongated openings 7 in position to aline vertically with the end openings 3 of the support 2. One end of the spring 6 is extended, as indicated at 8, to form a finger piece. Two clamp members 9 of like formation are provided and are disposed at the ends of the support 2 and spring 6. The clamp members 9 consist of straps or bars and their lower ends are reduced and threaded, as indicated at 10, and pass through the openings 3 and 7. A nut 11 is applied to the threaded end 10 of each of the clamp members 9 and engages the under side of the spring 6. The upper end of each clamp member 9 is bent laterally to form a hook 12 to engage over the upper edge of the battery 1 so as to retain the same in the required adjusted position. A lift 13 is located upon the outer side of each of the members 9 near the upper end thereof and provides convenient means for drawing upward upon the clamp member when it is required to disengage the bent end 12 from the battery or engage such end therewith.

The fastening means may be constructed entirely of strap or bar metal, whereby the same may be cheaply manufactured and in service is durable and effective and compact in arrangement. The fastener is secured to the required part of a machine by suitable fastenings 5 which extend through the spring 6 and support 2. The clamp members 9 are supported in the end portions of the spring 6 and part 2 and are limited in their downward movement by the shoulders 14 at the inner ends of the reduced portions 10 engaging the support 2 at the sides of the openings 3 formed therein. The parts are so adjusted that the spring 6 exerts a down-pull on the members 9 so as to hold their bent ends 12 in positive engagement with the battery 1 to retain the latter in position against casual displacement from vibration or other movement of the machine. The bent ends 12 of the clamp members 9 are engaged with or disengaged from the battery by an up-pull on the lift 13. The extended end 8 of the spring 6 also provides convenient means for manipulating the fastening when engaging the same with or disengaging it from the battery.

What is claimed is:

A battery fastener comprising an elongated support having a battery resting thereon and provided with openings adjacent its ends, a spring member secured intermediate its ends to the elongated support, said spring member having slots adjacent its ends and in alignment with the openings in said elongated support, one end of said spring extending beyond the elongated support and forming a handle portion, side straps having their upper ends provided with hooks to engage the handles of the battery and having their lower ends reduced and screw threaded and extending through the openings and slots, and nuts threaded to the straps to draw the ends of the spring member toward the support and thereby secure the battery to the support.

In testimony whereof I affix my signature in presence of two witnesses.

JOHN MILLER.

Witnesses:
WILLIAM J. MILLER,
GEORGE MILLER.